United States Patent
Dorau

(10) Patent No.: US 9,319,354 B2
(45) Date of Patent: Apr. 19, 2016

(54) NETWORK STORAGE DEVICE AND METHOD FOR DATA TRANSMISSION VIA A SINGLE SERIAL NETWORK LINK

(75) Inventor: Kai Dorau, Hannover (DE)

(73) Assignee: Thomson Licensing (FR)

( * ) Notice: Subject to any disclaimer, the term of this patent is extended or adjusted under 35 U.S.C. 154(b) by 303 days.

(21) Appl. No.: 13/808,091

(22) PCT Filed: Jun. 30, 2011

(86) PCT No.: PCT/EP2011/061043
§ 371 (c)(1),
(2), (4) Date: Jan. 2, 2013

(87) PCT Pub. No.: WO2012/001122
PCT Pub. Date: Jan. 5, 2012

(65) Prior Publication Data
US 2013/0110965 A1    May 2, 2013

(30) Foreign Application Priority Data

Jul. 2, 2010  (EP) .................................... 10305724

(51) Int. Cl.
| | |
|---|---|
| *H04L 12/861* | (2013.01) |
| *H04L 29/08* | (2006.01) |
| *H04L 12/863* | (2013.01) |
| *G06F 15/167* | (2006.01) |
| *G06F 3/06* | (2006.01) |

(52) U.S. Cl.
CPC .......... *H04L 49/9036* (2013.01); *G06F 15/167* (2013.01); *H04L 47/6255* (2013.01); *H04L 67/2842* (2013.01); *G06F 3/0656* (2013.01)

(58) Field of Classification Search
CPC ............ H04L 49/9036; H04L 47/6255; H04L 67/2842; G06F 15/167; G06F 3/0656
See application file for complete search history.

(56) References Cited

U.S. PATENT DOCUMENTS

| | | | | |
|---|---|---|---|---|
| 7,386,627 | B1* | 6/2008 | Lango et al. .................. | 709/236 |
| 7,472,231 | B1 | 12/2008 | Cihla et al. | |
| 8,171,487 | B2* | 5/2012 | Buesing et al. ............... | 718/106 |
| 2001/0037406 | A1 | 11/2001 | Philbrick et al. | |
| 2002/0108005 | A1* | 8/2002 | Larson et al. .................. | 710/52 |
| 2005/0251500 | A1 | 11/2005 | Vahalia et al. | |

(Continued)

FOREIGN PATENT DOCUMENTS

| | | |
|---|---|---|
| CN | 1664794 | 9/2005 |
| WO | WO2007100521 | 9/2007 |

OTHER PUBLICATIONS

Ari et al., "SANBoost Automated SAN-Level Caching in Storage Area Networks", 2004 International Conference on Automatic Computing, May 17, 2004, pp. 164-171.

(Continued)

*Primary Examiner* — Michael C Lai
(74) *Attorney, Agent, or Firm* — Jack Schwartz & Associates, PLLC

(57) ABSTRACT

A network storage device receives data from and transmits data to a plurality of network devices via a single serial network link. The network storage device has a cache selector, for transferring data associated with individual ones of the plurality of-network devices to corresponding cache queues. Data is output from a cache queue to the storage device when at least one complete block can be written to the storage device, and from the cache queue to the serial network link when at least one complete frame can be transmitted.

7 Claims, 3 Drawing Sheets

(56) References Cited

U.S. PATENT DOCUMENTS

2008/0028147 A1 1/2008 Eagleton et al.
2010/0070652 A1* 3/2010 Maciocco et al. ............ 709/248
2010/0199039 A1* 8/2010 Bauman et al. ............... 711/114

OTHER PUBLICATIONS

Kataoka et al., "Distributed Cache System for Large-Scale Networks", 2006 Proceedings of the International Multi-Conference on Computing in the Global Information Technology, Aug. 1, 2006, pp. 1-40.

He et al., "STICS-To-IP Cache for Storage Area Networks", Journal of Parallel and Distributed Computing, vol. 64, No. 9, Sep. 2004, pp. 1069-1085.

Yasuda et al., "Concept and Evaluation of X-NAS a Highly Scalable NAS System", 20th IEEE Conference on Mass Storage Systems and Technologies, Apr. 1, 2003, pp. 219-227.

Zhang et al., "BUCS—A Bottom-Up Cache Structure for Networked Storage Servers", Proceedings of the 2004 International Conference on Parallel Processing, Aug. 15, 2004, pp. 310-317.

Motwani et al., "Caching Queues in Memory Buffers", 2004 ACM-SIAM Symposium on Discrete Algorithms, New Orleans, Louisiana, USA, Jan. 11, 2004, pp. 541-549.

Karedla et al., "Caching Strategies to Improve Disk System Performance", Computer, vol. 27, No. 3, Mar. 1994, pp. 38-46.

* cited by examiner

NETWORK STORAGE DEVICE AND METHOD FOR DATA TRANSMISSION VIA A SINGLE SERIAL NETWORK LINK

This application claims the benefit, under 35 U.S.C. §365 of International Application PCT/EP2011/061043, filed Jun. 30, 2011, which was published in accordance with PCT Article 21(2)on Jan. 5, 2012in English and which claims the benefit of European patent application No. 10305724,6, filed Jul. 2, 2010.

BACKGROUND OF THE INVENTION

In modern multimedia environments, e.g. environments for digital video production typically comprising several digital cameras, display monitors, scanners etc., large amounts of high resolution multimedia data is transferred via a high speed network connecting the aforementioned devices also referred to as network devices. For permanent storage of data a suitable storage device plays a key role in such a multimedia environment. Usually, a block based network storage device such as an array of hard disks or flash memories is connected to the network devices via a serial network, like Ethernet, FireWire or USB. A high data transfer rate to and from the network storage device is crucial for the performance of the whole multimedia environment, especially for real time applications.

BRIEF SUMMARY OF THE INVENTION

It is an object of the present invention to provide a computer system comprising a plurality of network devices that are connected to a block based network storage device via a serial network link and a method for operating said computer system, wherein a read/write process from and to the block based storage device offers an improved data rate.

The object is reached by the subject matter of the independent claims, advantageous embodiments are subject matter of the dependent claims.

According to the invention, a method for operating a computer system comprising a network storage device being connected by a serial network link to a plurality of network devices is provided. The network storage device comprises a block based storage device for storing data related to the network devices. Said network storage device further comprises a scalable cache selector having a cache memory that is sub-divided into a plurality of cache queues. Each cache queue is dedicated to one of the aforementioned network devices. The scalable cache selector further comprises a queue selector for assigning data packets received from and being sent to the network devices to the respective cache queue. The method according to the invention comprises the following steps:
a) Receiving at least one input data packet that is assigned to one of the network devices at the queue selector.
b) Transferring and storing said input data packet in a cache queue of the cache memory, said cache queue being assigned to the respective network device.
c) Sending an output data packet from said cache queue of the cache memory, the output data packet comprising at least a part of a data content comprised by the input data packets that are stored in said cache queue, wherein the step of outputting the output data packet is performed when the amount of data of the received input data packets that are stored in said cache queue exceeds a threshold value defining a predetermined size of the output data packet.

The method according to the invention is based on the following considerations:

According to the art, a cache memory is used for buffering data to be written to or to be read from a hard disk; the same applies to other block based storage devices. Such a hard disk cache memory buffers the data traffic from and to the actual hard disk, thereby releasing the drive from excessive movement of the read/write-head. It will now be referred to a computer system comprising such a block based storage device that is connected by a serial network link to a plurality of network devices. In such a system, a data stream received by the hard disk contains information/data packets coming from different sources/network devices such as different digital cameras. Due to the fact that the network connection is a serial network link, e.g. Ethernet, FireWire or USB, a sequence of data packets having different origins is delivered to the hard disk.

A cache memory according to the art is a simple buffer that stores information irrespective to its origin. Consequently, a data block that is written to the block based storage device, e.g. the hard disk, contains a "mixture" of data, i.e. data having a plurality of different origins. Referring to the multimedia environment as described above, by way of an example only, such a block could contain data that is related e.g. to a first and a second digital camera. In case, a user of such a multimedia environment desires to review a video stream from e.g. camera number one, data related to the stream of said camera has to be "collected" from a plurality of different blocks of the hard disk. As one data block may contain data of different origins, by reading such a data block in order to view data of a single origin, also data not requested are read. As a consequence, the read/write-head of the hard disk has to perform a huge number of movements. Obviously, this is a drawback with respect to the achievable data rate.

The method according to the invention is tackling this drawback at its root: The data stream received via the serial network link is stored in a structured cache memory instead of a simple buffer. In other words, data packets comprised by the data stream are sorted on the basis of their origin. Data packets received from a first source/first network device, e.g. a first digital camera are stored in a first cache queue while data packets coming from a second network device are stored in a second cache queue and so on. In case one of these cache queues exceeds a certain threshold level, preferably the threshold level is chosen to match with a block size of the block based storage device, a whole data block is transferred/written to the block based storage device. Consequently, the data stored in the block based storage device is sorted block by block according to the sources/network devices that are connected to the network storage device. In other words, each block of the storage device contains only data related to a single network device.

In the preceding paragraphs the method according to the invention has been explained for a write process by way of an example only. It is understood, the method is also applicable to a read process. This option will be explained in the detailed description.

The terms input and output data packet, frequently used in the following will be explained. Input and output are considered relative to the cache memory. Accordingly, a data packet coming from a network device or from the block based data storage that has to be stored inside the cache memory is an input data packet, while an output data packet is always leaving the cache memory in the direction towards network device or towards the block based data storage.

Preferably, during a process of writing to the block based storage device, step a) comprises receiving at least one input data packet from a network device via the serial network link and step c) comprises sending an output data packet to said block based storage device, wherein the predetermined size corresponds to a block size of the block based storage device. Further preferably, the predetermined size of the output data packet equals the block size of block based storage device.

Writing to the block based storage device according to the aforementioned method is advantageous because a data landscape on the block based storage device is created that contains huge segments containing data related to just one source. In other words, each segment of the storage device contains only data related to a single network device. Consequently, the data comprised by said block based storage device is much more sorted compared to a block based storage devices that has undergone a write processes known in the art. As a consequence, the storage device is accessible much faster—in case a hard disk is applied as a block based storage device a significant lower number of movements of the read/write-head is necessary.

Preferably, during a process of reading from the block based storage device, step a) comprises receiving at least one data block from the block based storage and step c) comprises sending an output data packet of a predetermined size to the serial network link. Further preferably, the predetermined size of the output data packet equals a frame size of the serial network link and further preferably the size of the data block received from the block based storage equals a block size of the block based storage device.

Advantageously, data related to a certain network device is read from the block based storage block by block. In case a hard disk is applied, the number of movements of the read/write-head is reduced to a minimum. As a consequence, the data rate increases. It is notably advantageous that with the aforementioned method, high resolution movie data may be read out from a hard disc drive in real time.

A network storage device according to the invention is provided for being connected by a serial network link to a plurality of network devices. The network storage device comprises a block based storage device for storing data related to the network devices. The network storage device further comprises a scalable cache selector having a cache memory that is sub-divided into a plurality of cache queues, wherein each cache queue is dedicated to one of the network devices. The scalable cache selector is capable of executing the method for reading and/or writing as described above.

Preferably, the block based storage device of the computer system is a hard disk drive or a flash drive. In case of a hard disk it is even more advantageous because movement of the read/write head is reduced, which speeds up reading and writing to the hard disk and reduces wearout.

Same or similar advantages that have been mentioned with respect to the method according to the invention apply to the computer system according to the invention.

BRIEF DESCRIPTION OF THE SEVERAL VIEWS OF THE DRAWINGS

In the following, the invention will be described in more details with reference to the figures.

FIG. 2 shows a dataflow process inside the network storage device known from FIG. 1 during a write process, while

DETAILED DESCRIPTION OF THE INVENTION

Figure 1:
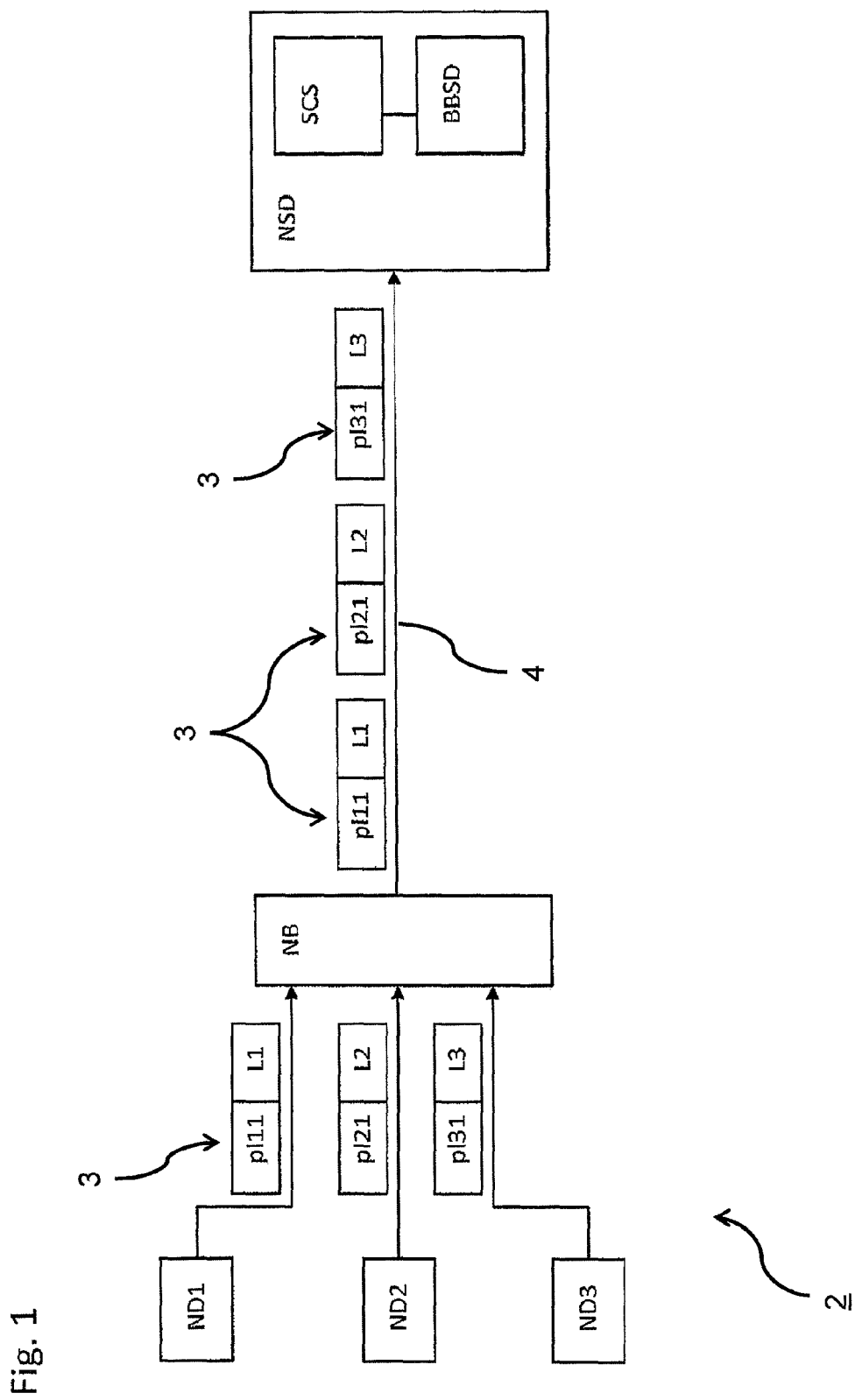
FIG. 1 shows a computer system comprising a plurality of network devices that are connected to a network storage device via a serial network link.

FIG. 1 shows a computer system 2 comprising a plurality of network devices ND1 . . . ND3 that are connected via a network bridge NB and a serial network link 4 to a network storage device NSD. The network devices ND1 . . . ND3 are e.g.: digital cameras, display devices such as monitors or beamers, scanners, etc. It is understood, a network device ND1 . . . ND3 could also be an application running on a computer. It is further possible that more than one network device ND1 . . . ND3, i.e. a plurality of applications are comprised/executed by only one machine/computer. It is further understood, the computer system 2 depicted in FIG. 1 may comprise more or less than three network devices ND1 . . . ND3.

All applications/network devices ND1 . . . ND3 are capable of sending and receiving data streams via the network, e.g.: the first network device ND1 sends an input data packet 3 comprising a pay-load package pil1 and a label L1 to the network bridge NB. The second and third network device ND2, ND3 can act in the same way, as indicated in FIG. 1. The labels L1 . . . L3 are indicative to the network device ND1 . . . ND3, e.g. L1 refers to the first network device ND1, L2 refers to the second network device ND2, etc. Since the network link between the network bridge NB and the network storage device NSD is a serial network link 4, such as Ethernet, FireWire, USB or the like, input data packets 3 are sent sequentially to the network storage device NSD. In other words, a data stream of consecutive input data packets 3 is provided to the network storage device NSD, wherein the input data packets 3 have different origins and are sent by different network devices ND1 . . . ND3.

The network storage device NSD comprises the scalable cache selector SCS and a block based storage device BBSD, e.g. an array of hard disc or flash memories.

Figure 2:
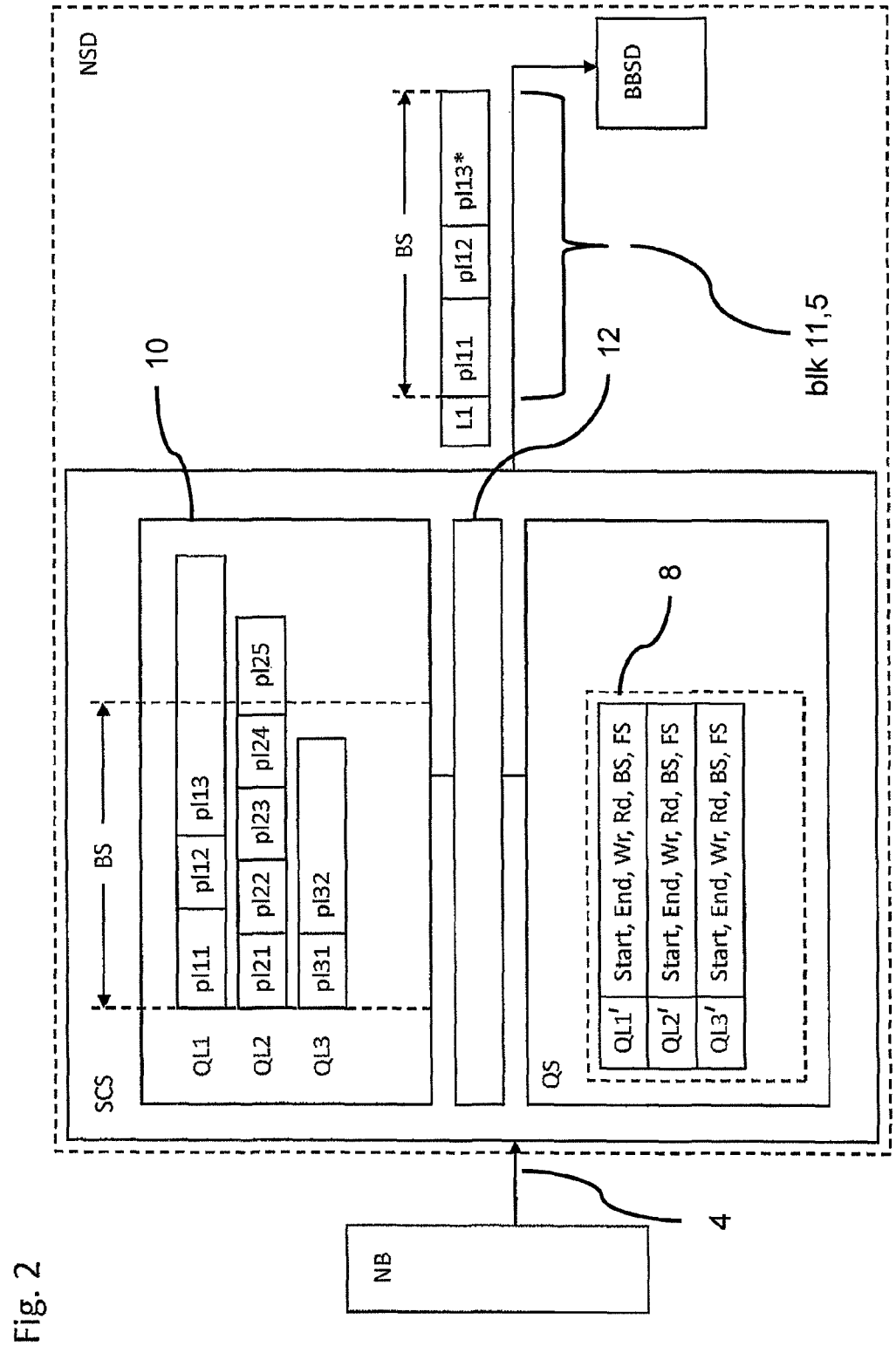

In the following, first of all, the functionality of the network storage devices NSD during a process of writing to the block based storage device BBSD will be explained by reference to FIG. 2. Afterwards, the functionality of the network storage devices NSD during a read process will be explained by making reference to FIG. 3.

A data stream, comprising a plurality of input data packets 3 sent by different network devices ND1 . . . ND3 is received at the queue selector QS of the network storage devices NSD from the network bridge NB via the serial network link 4. The queue selector QS and a cache memory 10, both further comprised by the scalable cache selector SCS in the network storage device NSD, are linked together via a cache controller 12. The cache memory 10 comprises a plurality of cache queues QL1 . . . QL3. The major task of the queue selector QS is sorting the incoming data packets 3 into the cache queues QL1 . . . QL3 of the cache memory 10. The queue selector QS comprises a cache queue file 8 comprising entries QL1' . . . QL3' for storing information of the different cache queues QL1 . . . QL3 for this purpose. According to the exemplary embodiment given by FIG. 2, each cache queue file entry QL1' . . . QL3' comprises information about a start and an end address (Start, End) of the respective cache queue QL1 . . . QL3 inside the cache memory 10. Further, a frame size FS of the serial network link 4, a block size BS of the block based storage device BBSD and a read and write address (Rd, Wr) pointing to the start address per entry, is comprised by the cache queue file entries QL1' . . . QL3'.

Input data packets 3 received at the queue selector QS each comprise a payload package p111 ... p131 and a label L1 ... L3. Depending on the network protocol, the label L1 ... L3 is a suitable network header. The Label L1 ... L3 is indicative to the network device ND1 ... ND3 sending the respective input data packet 3. The queue selector QS reads the label L1 ... L3 of the input data packet 3 and stores the payload package p111 ... p131 in the appropriate cache queue QL1 ... QL3 that is dedicated to the respective network device ND1 ... ND3. E.g.: the input data packet 3 sent by the third network device ND3 comprising payload package p131 and label L3 will be stored in the third cache queue QL3, as it is indicated in FIG. 2. The handling of the payload packages p111 ... p133 stored in the different cache queues Q11 ... QL3 of the cache memory 10 is done by a suitable cache controller 12.

With increasing number of incoming input data packets 3 the cache queues QL1 ... QL3 of the cache memory 10 are filled up with payload data more and more. The cache queues QL1 ... QL3 are filled up until their level reaches a predetermined threshold level. According to the embodiment given in FIG. 2, this threshold level is the block size BS of the block based storage device BBSD. According to the exemplary status of the Network storage device NSD shown in FIG. 2, the first and second cache queue QL1, QL2 have reached their threshold level BS. All of the cache queues QL1 ... QL3 are given the same threshold level BS.

In a next step, a whole data block containing solely data related to one network device ND1 ... ND3 is written to block based storage device BBSD. This data block is an output data packet 5. According to FIG. 2 the output data packet 5, i.e. data block blk11 comprises solely data related to the first network device ND1 and is written to a block of the block based storage device BBSD. Data block blk11 comprises the entire first and second payload data package pill and p112 that are concatenate and given a label L1 indicating that the comprised payload data relates to the first network device ND1. Since the sum of the first and second payload data package p111, p112 does not reach the block size BS, further data can be added to the data block blk11. However, the third payload package p113 is too large and the sum of all three data packages p111, p112 and p113 would exceed the block size BS, i.e. all three packages could not be written completely into a single block of the block based storage device BBSD. As a solution, the last payload data package p113 is split up. Only a part of it, named p113*, is taken to the block blk11, the rest of it remains in the cache queue QL1. This remaining data is written to the block based storage device BBSD together with the next payload data packages, in case the cache queue QL1 again reaches its threshold value BS.

The same method of writing to the block based storage device BBSD applies to the further cache queues QL2 and QL3, in case they reach their threshold value BS. By reference to the exemplary embodiment in FIG. 2, the next block to be written to the block based storage device BBSD will comprise data packets p121 to p124 and a part of payload data package p125, presently stored in the second cache queue QL2.

Preferably, the size of the cache queues QL ... QL3 given by the start and end addresses (Start, End) is sufficient to capture at least two blocks with a block size BS. When the queue selector QS sends an output data packet 5, i.e. a data block to the block based storage device BBSD from a first cache queue QL1 ... QL3, each other cache queue QL1 ... QL3 can be filled up with incoming payload data packages p111 ... p132 in parallel. However, preferably a block must be sent completely before other payload packages p111 ... p132 can be stored in the respective cache queue QL1 ... QL3.

Figure 3:
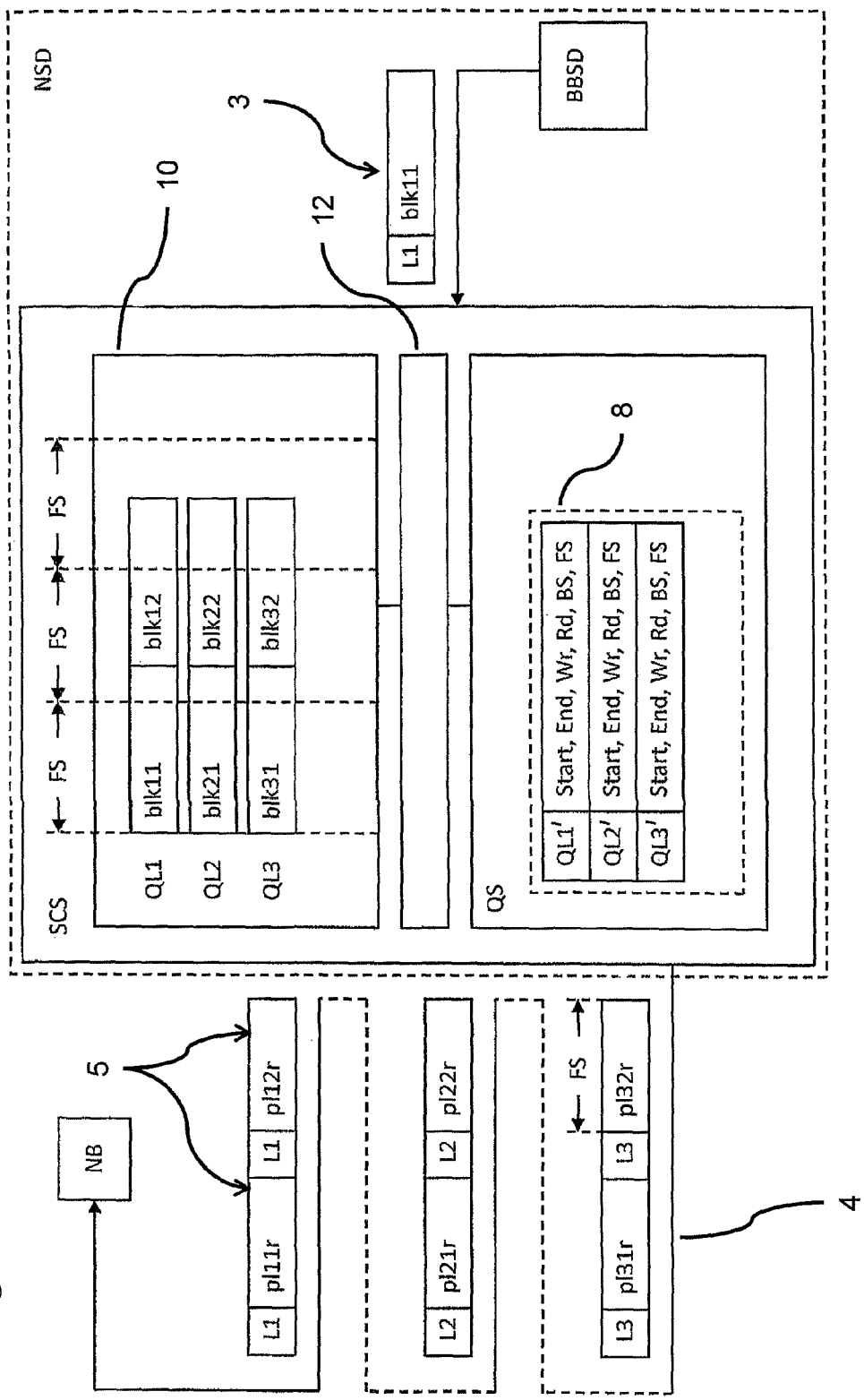
FIG. 3 shows a dataflow process inside the network storage device known from FIG. 1 during a read process.

In the following, a data flow from the block based storage device BBSD, i.e. a read operation will be explained by reference to FIG. 3.

The read operation is initiated by a network device ND1 ... ND3 requesting data from the network storage device NSD. By way of an example only, in FIG. 3 a data block blk11 requested by the first network device ND1, e.g. a display device, is read from the network storage device NSD. It is understood, this data block blk11 is an input data packet since it is sent from the blocked based storage device BBSD to the scaleable cache selector SCS and further to the cache memory 10. The block blk11 is labeled L1, indicating that the payload has to be delivered to the first network device ND1. The queue selector QS reads this prefix and entries block blk11 into the first cache queue QL1.

The cache queues QL1 ... QL3 are dedicated to a respective one of the network devices ND1 ... ND3, as it is known from the write-process described in FIG. 2. The location of the cache queues QL1 ... QL3 is defined by the entries QL1' ... QL3' of a cache queue file 8, indicating the start and end address (Start, End) as well as the block and frames size (BS, FS) of the respective cache queues QL1 ... QL3. Again the cache queues QL1 ... QL3 are given a common threshold level. However, in contrast to the write process not the block size BS but the frame size FS of the serial network link 4 is taken as a threshold level. The queue selector QS is sending data sub-streams prefixed by the corresponding levels L1 ... L3 and payload packages p111r ... p132r having the frame size FS via the serial network link 4 to the network bridge NB and further to the respective network devices ND1 ... ND3. It is understood, the payload packages p111r ... p132r comprising corresponding levels L1 ... L3 are output data packets 5, since they are leaving the cache memory 10.

When a piece of a block blk11 ... blk32 remains in the designated cache queue QL1 ... QL3, it has to be send in the next transfer cycle, i.e. when a new block has been stored in the respective cache queue QL1 ... QL3 and the threshold level FS is reached again. As it is known from the writing process, preferably, the block has to be sent completely before another block can be stored in the respective cache queue QL1 ... QL3. But due to remaining pieces of the blocks, it is sometimes necessary to send two blocks. When the queue selector QS sends sub-streams to the network bridge NB, from a first cache queue QL1 ... QL3, each other cache queue QL1 ... QL3 can be filled with data blocks coming from the block based storage device BBSD, assumed there is enough space in the cache memory 10.

The invention claimed is:

1. A method of operating a network storage device in one of a first and second operating mode, wherein a single serial network link connects the network storage device to a plurality of network devices, and the network storage device comprises a block-based storage device adapted to store data in blocks of data; a cache associated with the single serial network link, the cache including a cache memory sub-divided into a plurality of cache queues; and a queue selector associated with the cache, wherein each of the plurality of cache queues is associated with a respective one of the plurality of network devices, the method, in the first operating mode, comprising:
receiving, at the queue selector, data packets from at least one network device via the single serial network link,
transferring the data packets to a cache queue associated with the at least one network device for storage, and transferring data from the cache queue associated with the at least one network device to the block-based storage device when an amount of data stored in the cache queue associated with the at least one network device exceeds a first threshold value, and, in the second operating mode, receiving, at the queue selector, at least one data packet from the block based storage device, wherein the at least one data packet being destined for one of the plurality of network devices connected via the single serial network link, transferring the at least one data packet to one of the plurality of cache queues associated with the destined one of the plurality of devices for storage, and transferring data from the one of the plurality of cache queues associated with the destined one of the plurality of network devices via the single serial network link when an amount of data stored in the one of the plurality of cache queues exceeds a second threshold value.

2. The method of claim 1, wherein, in the first operating mode, the first threshold value is determined in accordance with a block size of the block-based storage device, and wherein, in the second operating mode, the second threshold value is determined in accordance with a frame size of the single serial network link.

3. The method according to claim 2, wherein the block based storage device is divided into segments, the method further comprising exclusively storing data blocks from individual ones of the at least one network device in corresponding associated segments.

4. A network storage device adapted to operate in one of a first and second operating mode and connected via a single serial network link to a plurality of network devices, said network storage device comprising:

a block-based storage device adapted for storing data received from or to be sent to the network devices in blocks of data, a cache associated with the single serial network link, the cache comprising a cache memory sub-divided into a plurality of cache queues, wherein each of the plurality of cache queues is associated with a respective one of the plurality of network devices, and a queue selector adapted to assign data packets received or to be sent via the single serial network link to one of the plurality of cache queues associated with a corresponding one of the plurality of network devices wherein, in the first operating mode, the queue selector receives data packets from at least one network device of the plurality of network devices via the single serial network link, the queue selector transfers the data packets to a cache queue associated with the at least one network device for storage, and a the cache queue associated with the at least one network device transfers data to the block-based storage device when an amount of data stored in the cache queue associated with the at least one network device exceeds a first threshold value, and, in the second operating mode, the queue selector receives at least one data packet from the block-based storage device, wherein the at least one data packet is destined for one of the plurality of network devices connected via the single serial network link, the queue selector transfers the at least one data packet to one of the plurality of cache queues associated with the destined one of the plurality of network devices for storage, and the cache queue transfers data from the one of the plurality of cache queues associated with the destined one of the plurality of network devices to the destined one of the plurality of network devices via the single serial network link when an amount of data stored in the cache queue exceeds a second threshold value.

5. The network storage device of claim 4, wherein the block-based storage device is one of a hard disk drive or and a flash drive.

6. The network storage device of claim 4, wherein, in the first operating mode, the first threshold value is determined in accordance with a block size of the block-based storage device, and wherein, in the second operating mode, the second threshold value is determined in accordance with a frame size of the single serial network link.

7. The network storage device of claim 6, wherein the block-based storage device is divided into segments, and the network storage device is adapted to exclusively store data blocks from individual ones of the network devices in corresponding associated segments.

* * * * *